US011271931B2

(12) United States Patent
Nagaraja et al.

(10) Patent No.: US 11,271,931 B2
(45) Date of Patent: Mar. 8, 2022

(54) DYNAMIC AND PRIVATE SECURITY FINGERPRINTING

(71) Applicant: Visa International Service Association, San Francisco, CA (US)

(72) Inventors: Vinjith Nagaraja, Austin, TX (US); Nagaveera Venkata Su Tavvala, Cedar Park, TX (US); Jose Rios Trevino, Austin, TX (US); Vamshi Ramarapu, Austin, TX (US); Swapneel Mahajan, Cupertino, CA (US); Joel Trunick, Austin, TX (US); Shalini Mayor, Foster City, CA (US); James Myers, Round Rock, TX (US); Raymond Brammer, Round Rock, TX (US); Ireneusz Pazdzierniak, Foster City, CA (US); Shashi Velur, Austin, TX (US); Feng Chi Wang, Austin, TX (US); Vincent Hesener, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 196 days.

(21) Appl. No.: 16/576,312

(22) Filed: Sep. 19, 2019

(65) Prior Publication Data
US 2020/0099684 A1  Mar. 26, 2020

Related U.S. Application Data

(60) Provisional application No. 62/734,137, filed on Sep. 20, 2018.

(51) Int. Cl.
*H04L 29/06* (2006.01)
*G06F 21/45* (2013.01)
(Continued)

(52) U.S. Cl.
CPC .......... *H04L 63/0876* (2013.01); *G06F 21/45* (2013.01); *H04L 9/3236* (2013.01)

(58) Field of Classification Search
CPC . H04L 63/0876; H04L 9/3236; H04L 9/3239; G06F 21/45; G06F 21/31
See application file for complete search history.

(56) References Cited

U.S. PATENT DOCUMENTS 8,838,967 B1   9/2014  Mills et al.
9,032,217 B1   5/2015  Brandwine
(Continued)

OTHER PUBLICATIONS

Kornblum, "Identifying Almost Identical Files Using Context Triggered Piecewise Hashing," Digital Investigation vol. 3, Suppl., pp. 91-97 (Sep. 2006).
(Continued)

*Primary Examiner* — Nelson S. Giddins
(74) *Attorney, Agent, or Firm* — Kilpatrick Townsend & Stockton LLP

(57) ABSTRACT

Techniques for securely generating and using a "fingerprint" for authentication. A server computer receives a first data set from a user device (including a first fuzzy hash of first user data on the user device). The server computer generates a first fingerprint value based on the first data set. The server computer detects an event corresponding to a user in association with the user device. The server computer identifies a baseline fingerprint value (generated based on a baseline fuzzy hash of user data on the user device). The server computer compares the first fingerprint value to the baseline fingerprint value to generate a similarity score. The server computer may determine that the similarity score exceeds a threshold value but does not represent an exact match, and, based on the similarity score, authenticate the user and update the baseline fingerprint value based on the first fingerprint value.

20 Claims, 10 Drawing Sheets

(51) Int. Cl.
*H04L 9/32* (2006.01)
*G06F 21/31* (2013.01)

(56) References Cited

U.S. PATENT DOCUMENTS

| | | |
|---|---|---|
| 9,660,974 B2 | 5/2017 | Grajek et al. |
| 9,832,193 B2 | 11/2017 | Amaladoss et al. |
| 9,888,380 B2 | 2/2018 | Gupta et al. |
| 10,013,539 B1 * | 7/2018 | Hazan .................. G06F 21/316 |
| 2014/0066015 A1 * | 3/2014 | Aissi .................. H04L 63/0876 |
| | | 455/411 |
| 2015/0237038 A1 * | 8/2015 | Grajek .................. H04L 67/10 |
| | | 726/8 |

OTHER PUBLICATIONS

"Ssdeep—Fuzzy hashing program" https://ssdeep-project.github.io/ssdeep/index.html, accessed Sep. 19, 2019, 3 pages.
"Locality-Sensitive Hashing", Wikipedia, Available online at http://web.archive.org/web/20180215085602/https://en.wikipedia.org/wiki/Locality-sensitive hashing, retrieved on Feb. 15, 2018, 9 pages.
Extended European Search Report dated Jan. 29, 2020 for EP Application No. EP19198732.0, 11 pages.

* cited by examiner

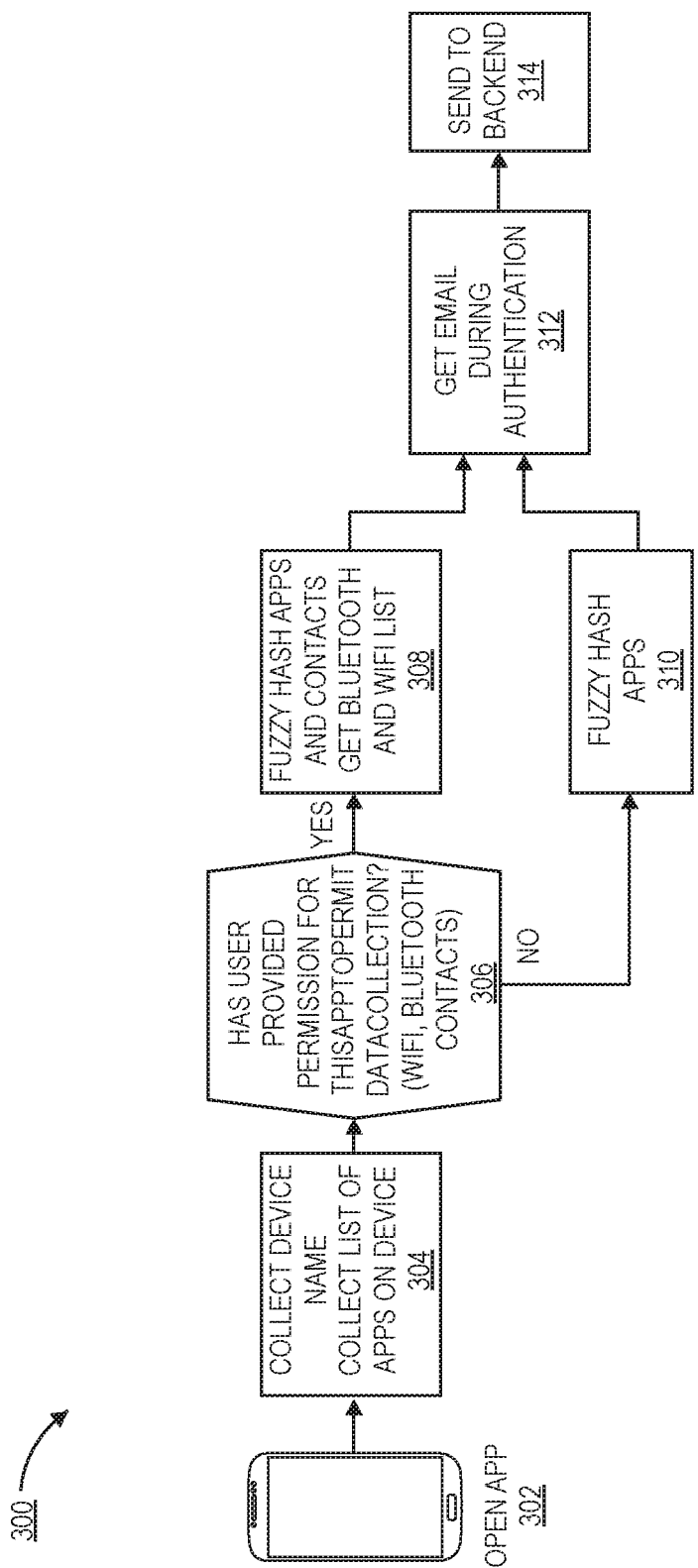

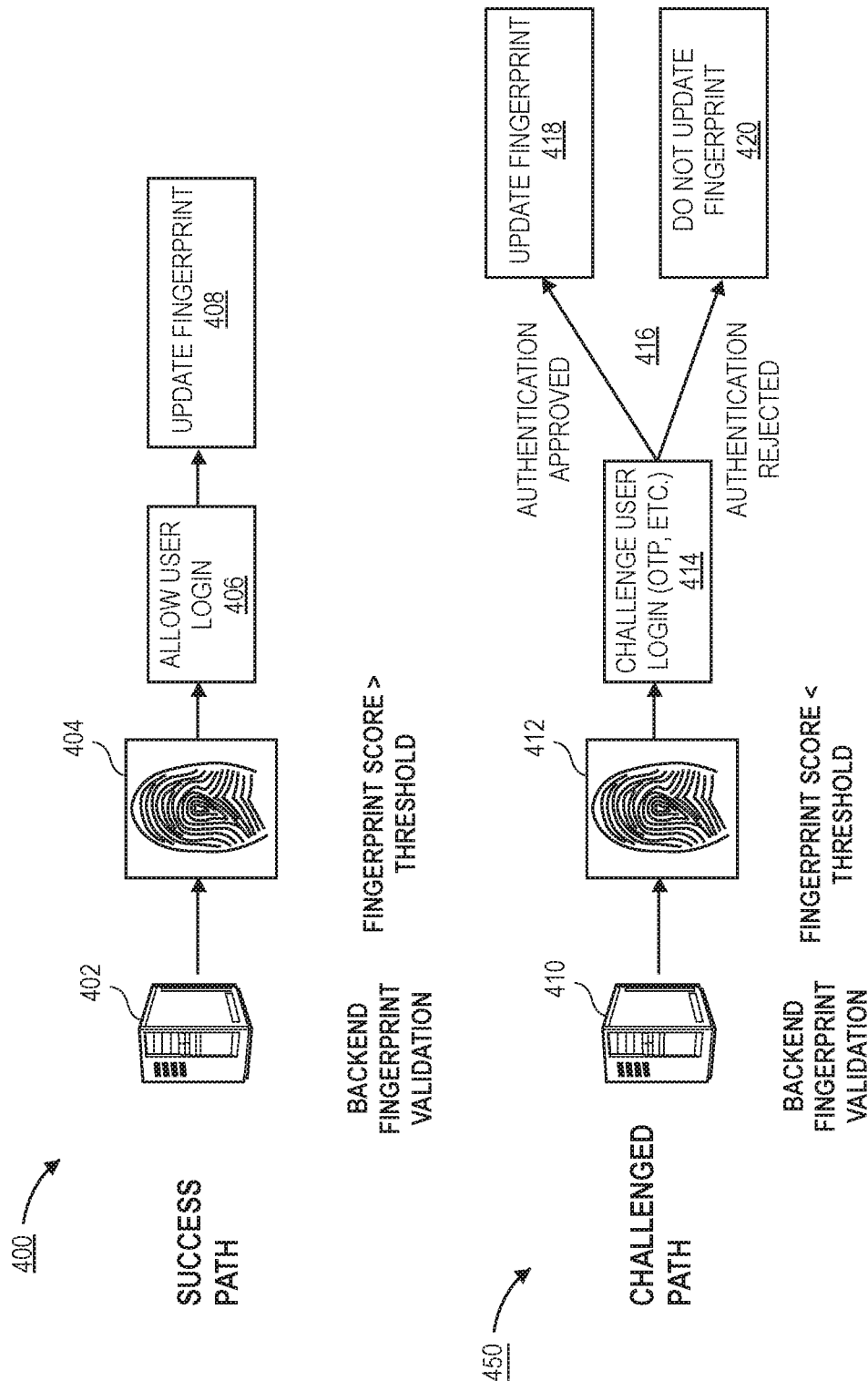

DYNAMIC AND PRIVATE SECURITY FINGERPRINTING

CROSS-REFERENCE TO RELATED APPLICATIONS

This application is a non-provisional application of U.S. Patent Application No. 62/734,137, filed on Sep. 20, 2018, which is herein incorporated by reference in its entirety.

BACKGROUND

Access to a resource may be granted or denied based on a user authentication process. Authenticating a user may involve checking the user's device or location for consistency with a registered device or location.

Systems exist for generating a "device fingerprint" characterizing a user device. The device fingerprint may be based on, for example, the type of the device (e.g. a particular make and model of mobile phone, tablet, or computer), the location of the device, or settings enabled on the device. The more variables available to generate the device fingerprint, the lower the likelihood that an entity can fraudulently duplicate the fingerprint.

However, challenges are raised as the amount of data points in the fingerprint is increased. Users may not wish to share certain types of data. Access to some types of data may be blocked by the device. Further, some types of data may be updated, which could change the fingerprint. For example, a user could change the browser used on their computer, which could result in the fingerprint indicating that the user cannot be authenticated. Additionally, while the more data is used the more accurate the fingerprint can be, collecting certain types of data creates user privacy issues.

Embodiments of the present invention address these and other problems, individually and collectively.

BRIEF SUMMARY

According to some embodiments, a process for dynamic and private security fingerprinting includes retrieving, by a server computer, a first data set from a user device, wherein the first data set comprises a first fuzzy hash of user data on the user device. Based on the first data set, the server computer generates a first fingerprint value. The server computer detects an event corresponding to a user in association with the user device. The server computer identifies a baseline fingerprint value, wherein the server computer generated the baseline fingerprint value based on a baseline fuzzy hash of user data on the user device. The server computer compares the first fingerprint value to the baseline fingerprint value to generate a similarity score. The server computer determines that the similarity score exceeds a threshold value but does not represent an exact match. Based on the similarity score, the server computer authenticates the user and updates the baseline fingerprint value based on the first fingerprint value.

According to other embodiments, a server computer includes a memory, a processor, and a non-transitory computer-readable medium comprising instructions, which, when executed by the processor, perform the steps of: retrieving a first data set from a user device, wherein the first data set comprises a first fuzzy hash of user data on the user device; based on the first data set, generating a first fingerprint value; detecting an event corresponding to a user in association with the user device; identifying a baseline fingerprint value, wherein the server computer generated the baseline fingerprint value based on a baseline fuzzy hash of user data on the user device; comparing the first fingerprint value to the baseline fingerprint value to generate a similarity score, determining that the similarity score exceeds a threshold value but does not represent an exact match; and, based on the similarity score, authenticating the user and updating the baseline fingerprint value based on the first fingerprint value.

According to other embodiments, a process for dynamic and private security fingerprinting includes collecting, by a user device, a first data set, wherein the first data set comprises a first fuzzy hash of user data on the user device; transmitting, by the user device to a server computer, the first data set, the server computer using the first data set to generate a first fingerprint value; handling, by the user device, an event corresponding to a user in association with the user device; transmitting, by the user device to the server computer, information characterizing the event; receiving, by the user device from the server computer, an indication of whether the user is authenticated, the indication determined by the server computer by comparing the first fingerprint value to a stored baseline fingerprint value to generate a similarity score that exceeds a threshold value but does not represent an exact match.

BRIEF DESCRIPTION OF THE DRAWINGS

FIG. 3 shows a simplified schematic diagram illustrating example operations performed by a user device, according to some embodiments.

FIG. 4 shows a simplified schematic diagram illustrating example operations performed by a server computer, according to some embodiments.

DETAILED DESCRIPTION

Figure 1:
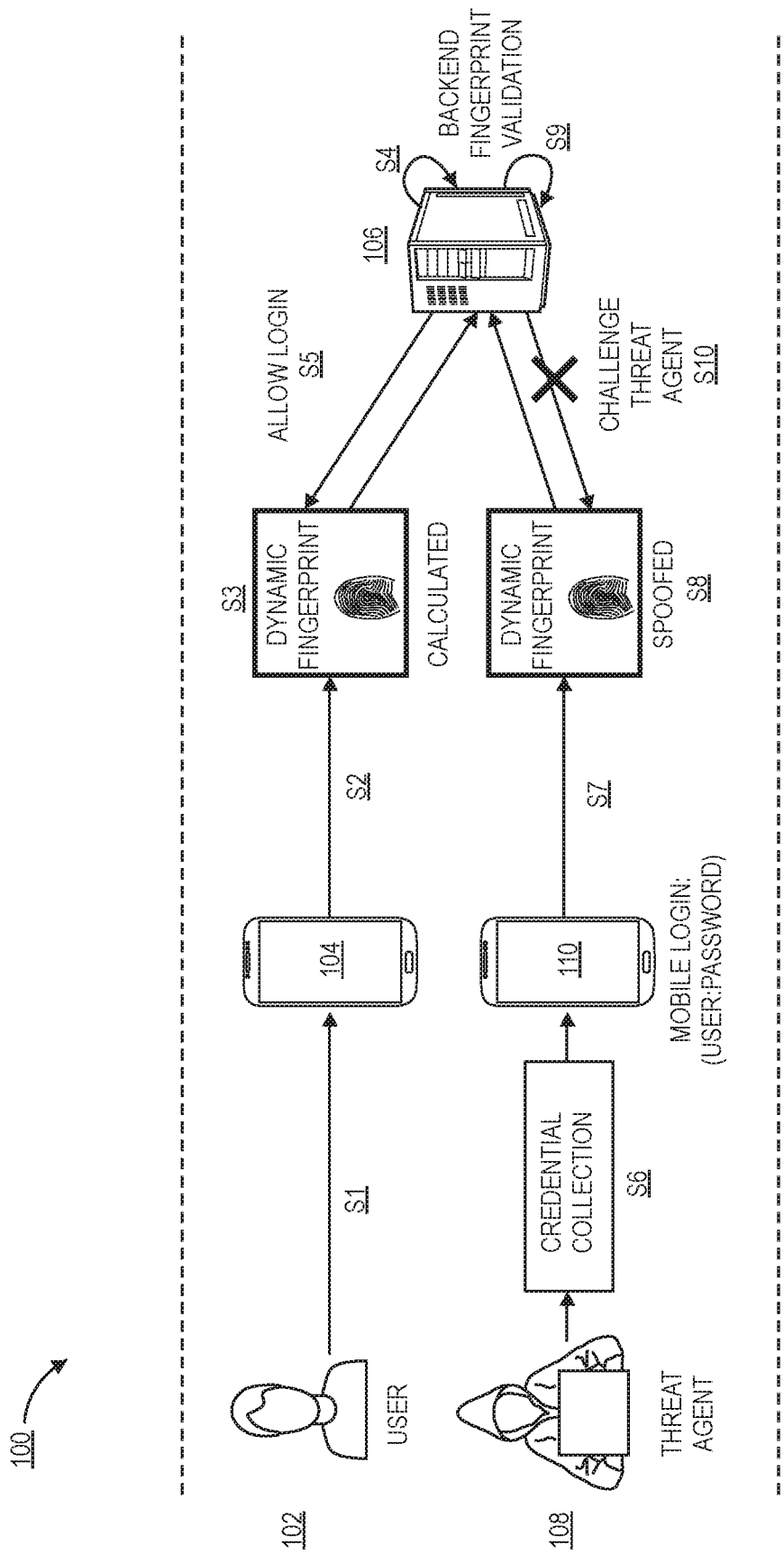
FIG. 1 shows a simplified schematic diagram illustrating an example process for using security fingerprinting to authenticate a user.

Generally, embodiments provide techniques for dynamically and securely managing and using a device fingerprint. In some prior systems, such device fingerprints cause security concerns, as they can include data that a user does not wish to share across applications or send over a network. Techniques for addressing these concerns include generating one or more fuzzy hashes of user data. In some cases, a user device may accept input from a user establishing subsets of data that should be fuzzy hashed. The user data, including one or more fuzzy hashes, may then be transmitted to a server computer for authentication.

The server computer may generate a fingerprint value based on the received user data. The server computer may maintain a database of baseline fuzzy hashes corresponding to different users and/or user devices. The server computer may identify a corresponding baseline fuzzy hash (e.g., using an identifier of the user). The server computer may compare the fingerprint values to determine whether the user/user device is authentic (e.g., not likely to be a fraudulent impostor). Advantageously, by using fuzzy hashes, the user data need not perfectly match the user data from an earlier time when the baseline value was established. Accordingly, the underlying data can be preserved while allowing flexibility to adapt to natural changes to a user device.

Prior to discussing embodiments of the disclosure, descriptions of some terms may be helpful in providing a better understanding thereof.

The term "user" may include an individual or entity. The user may be an individual interacting with a user computing device (e.g., a mobile phone or tablet). The user may be a consumer or business that is associated with an account and whose account can be used to conduct transactions, including a payment transaction.

The term "user device" may include a device that can be used to communicate with another device or system. The user device may be capable of conducting communications over a network. A user device may be in any suitable form. For example, suitable user devices can be hand-held and compact so that it can fit into a user's wallet and/or pocket (e.g., pocket-sized). The user computing can include a processor, and memory, input devices, and output devices, operatively coupled to the processor. Specific examples of user computing devices include cellular or mobile phones, tablet computers, desktop computers personal digital assistants (PDAs), pagers, portable computers, smart cards, and the like. Additional user computing may include wearable devices, such as smart watches, glasses fitness bands, ankle bracelets, rings, earrings, etc. In some embodiments, the user device may include automobiles with remote communication capabilities.

The term "user data" may include data associated with a user. User data may include a name, mailing address, shipping address, phone number, payment account number, date of birth, marital status, income, social security number, demographic data, etc. In some embodiments, user data may also include user preferences, notification methods, and prior transaction history. User data may further include data stored to and/or settings enabled on a user device associated with the user.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may include any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The term "authentication" and its derivatives may include a process by which the credential of an endpoint (including but not limited to applications, people, devices, processes, and systems) can be verified to ensure that the endpoint is who they are declared to be.

A "fingerprint" or "fingerprint value" may include identifying something using a unique pattern. In some embodiments, a fingerprint or fingerprint value may be information associated with a user and/or a user device. The fingerprint value may be a set of information associated with a user and/or user device. Such a set of information may be collected by a remote computing device. In some cases, the fingerprint value may be, or include, a derivative of such a set of information (e.g., the fingerprint value may be, or include, a numerical value and/or a combination of characters generated by applying an algorithm to a data set). The fingerprint value may be used to identify the device and/or a user of the device. This may allow a remote application to detect and prevent fraudulent attempts to access a resource. As an example, a fingerprint value may correspond to a collection of data on a user device, such as image metadata, installed applications, calendar information, and the like.

A "baseline fingerprint value" may include a fingerprint value that serves as a basis for other fingerprint values. For example, a fingerprint value may be determined at some initial time and stored in association with a user and/or user device. When a subsequent fingerprint value is determined, the subsequent fingerprint value can be compared to the baseline fingerprint value to ascertain the authenticity of the subsequent fingerprint value.

A "hash" or "hash value" is a value (generally of fixed size) generated from data of arbitrary size (e.g., a string of text). A hash may be, for example, a numerical or string value. The hash may be significantly smaller than the data itself. A hash may be generated by a "hash function" such that it is extremely unlikely that some other data will produce the same hash value, and it is extremely difficult to reconstruct the data based on the hash value.

A "fuzzy hash" may include a type of hash that can be used to identify homologous data. Unlike other hashes such as cryptographic hashes, a fuzzy hash (e.g., a context triggered piecewise hash (CTPH)) can be compared to a baseline fuzzy hash, and determine a match without requiring the two underlying data sets to be identical. Fuzzy hashing is described in Kornblum, "Identifying Almost Identical Files Using Context Triggered Piecewise Hashing," *Digital Investigation* Vol. 3, Suppl., pp. 91-97 (September 2006).

An "event" may include anything that happens. Some events may be associated with a user interacting with a user device. Examples of events include a user logging in to an application or website, a user opening up an application, and a user initiating a purchase transaction via a user device.

A "similarity score" may include a score corresponding to how two or more things may resemble one another. In some embodiments, a similarity score may include a numerical value (e.g., 1 for slightly similar and 10 for very similar). Alternatively, or additionally, a similarity score may include a letter value (e.g., "A" for very similar and "F" for not similar). As a specific example, a similarity score may correspond to how similar two data sets are. Such a similarity score may be determined, for example, by comparing fuzzy hash values.

A "threshold value" may include a value that, if met or exceeded, merits a particular result or condition to occur. For example, a threshold value may be used to compare to some other value, and, if the other value exceeds the threshold value, some event may transpire. As a specific example, if a similarity score exceeds a threshold value, a system may authenticate a user, as described herein. In some cases, events may further be triggered if a value is less than a threshold value. In some cases, multiple threshold values may be used to establish multiple different possible results.

Details of some embodiments will now be described.

FIG. 1 shows a simplified schematic diagram 100 of an example process for using security fingerprinting to authenticate a user. Responsive to a detected event, fingerprint values are used by a server computer 106 to determine whether a legitimate user 102 or a threat agent 108 (e.g., a fraudster who is not authorized to perform some action) is responsible for the event.

At step S1, the user 102 may attempt to access a resource via the user device 104. The user device 104 may be a device operated by a user, such as a mobile phone, tablet, computer, etc. The user device 104 may include installed applications. The user device 104 may include a variety of parameters, such as user preferences, user data (e.g., contacts, images and associated metadata, etc.), and settings (e.g., preferred Wi-Fi connections and browser settings). Additional details about an example user device and its components are described below with respect to FIG. 8.

The user device 104 may receive user input, from a user 102, associated with an event. For example, the user 102 may attempt, via the user device 104, to access a protected resource. The user 102 may attempt to log into a secure system, such as an application, website, and/or the like.

To authenticate the user 102 in connection with the event, the user device 104 may collect user data. The user data may include applications on the user device, files on the user device, settings on the user device, contacts stored on the user device, image metadata stored on the user device, networks (e.g., Wi-Fi) available to or stored by the user device, and/or the like. The user device may generate a fuzzy hash based on at least a subset of the collected user data.

At step S2, the server computer 106 may retrieve data from the user device. For example, the server computer may pull the user data. As another example, the server computer 106 may receive a message from the user device 104 that includes the user data.

At step S3, based on the data from the user device, the server computer 106 may determine a fingerprint value associated with the user event. Determining a fingerprint value may include collecting and/or analyzing the data from the user device, as described below with respect to step 704 of FIG. 7. Alternatively, the fingerprint value may be determined on the user device prior to being transmitted to the server computer.

At step S4, the server computer 106 executes backend fingerprint validation. Backend fingerprint validation may comprise comparing the received fingerprint value to a baseline fingerprint value. The server computer 106 may identify a stored baseline fingerprint value. For example, the event may be a login and the login may include a user name. The server computer 106 may identify a baseline fingerprint value stored in association with the user name. The server computer may compare the baseline fingerprint value to the fingerprint value determined at S2. In this case, the user 102 is the same individual associated with the baseline value. Accordingly, the comparison may indicate a match. This may correspond to a similarity level between the baseline fingerprint value and the new fingerprint value exceeding a threshold.

At step S5, the server computer 106 grants the user 102 a permission associated with the event detected at S1. The server computer 106 may, for example, allow the user to access a resource (e.g., allow the user to login to a secure service).

At step S6, a threat agent 108 may attempt to access a resource via a threat agent device 110. The threat agent 108 may, for example, have misappropriated login information belonging to user 102. The threat agent 108 may enter login credentials via the threat agent device 110, or otherwise input information into the threat agent device 110 requesting access to a protected resource. In some cases, the threat agent 108 may attempt to spoof the profile of the user device 104. The threat agent device 110 may collect data such as files and settings stored on the threat agent device 110.

At step S7, the server computer 106 retrieves the data from the threat agent device 110. At step S8, based on the retrieved data, the server computer 106 determines a fingerprint value associated with the threat agent event.

At step S9, the server computer 106 executes backend fingerprint validation (this time, based on the data associated with threat agent 108 and/or threat agent device 110). For example, based on the misappropriated login credentials entered by the threat agent 108, the server computer may identify the baseline fingerprint value stored in association with user 102. Given that the fingerprint of threat agent device 110 differs substantially from the fingerprint of the user device 104, the match level is low in this case. For example, the threat agent device 110 may include different software, emails, and images than the user device 104 associated with the legitimate user 102. Accordingly, the server computer 106 may determine that the fingerprint value associated with the threat agent device 110 does not match the baseline fingerprint value.

At step S10, the server computer 106 challenges the threat agent. The server computer 106 may refuse access to the resource. Alternatively, or additionally, the server computer 106 may request additional verifying information.

Figure 2:
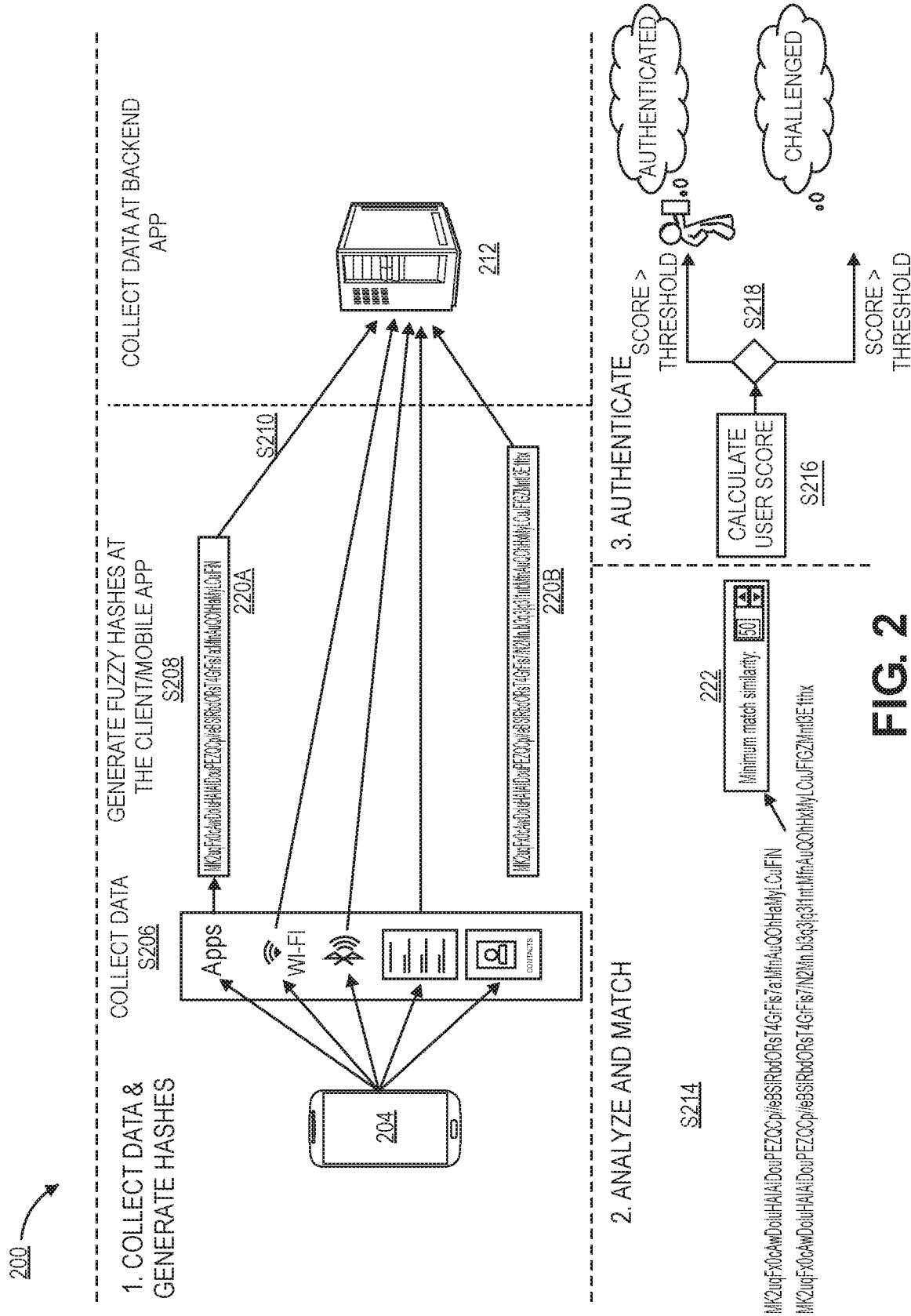
FIG. 2 shows a simplified schematic diagram illustrating an example process for security fingerprinting using fuzzy hashes.

FIG. 2 shows a simplified schematic diagram illustrating an example process for security fingerprinting using fuzzy hashes.

At S206, a user device 204 (which may be substantially similar to user device 800 described below with respect to FIG. 8) may collect data corresponding to a user. The user device 204 may collect various data elements characterizing the user and/or user device such as: user time/time zone settings, device battery status, screen resolution, device audio settings, installed/available fonts (Flash or JavaScript), whether World Wide Web Consortium (W3C) Application Programming Interfaces (APIs) are supported on the browser, Transport Layer Security (TLS) version support, Browser Web Bluetooth API, Browser Network Information API (to access information about the network connection in use by the device), Browser Magnetometer API (to measure magnetic field in the X, Y, and Z axes), and/or FIDO U2F API (to interact with Universal Second Factor (U2F) devices).

At S208, some or all of the collected data may be hashed to preserve privacy. For example, the user device 204 may, via an application executing thereon, generate one or more fuzzy hashes based on information such as installed applications and stored contacts. Fuzzy hashing is a way to hash data while allowing a partial match of the underlying information, rather than an exact match as required by traditional hashing. Also known as context triggered piecewise hashing (CTPH), fuzzy hashing programs have been developed under the ssdeep project (See ssdeep Project at https://ssdeep-project.github.io/ssdeep/index.html). Fuzzy hashing and the ssdeep project are described in Kornblum, "Identifying Almost Identical Files Using Context Triggered Piecewise Hashing," *Digital Investigation* Vol. 3, Suppl., pp. 91-97 (September 2006). A fuzzy hashing algorithm, e.g., as described in Kornblum, may be applied to a data set, resulting in a string of letters and/or numbers (e.g., 220A and 220B). As described in Kornblum, fuzzy hashing was developed for comparing files that have been slightly altered.

Such a fuzzy hashing algorithm may be applied to some or all of the data retrieved from the user device. In some cases, data for which elevated privacy is desired may be fuzzy hashed. Such data may include, for example, applications installed on the user device, contacts stored in association with the user device, or image metadata stored in association with the user device. Other data (e.g., data for which not elevated privacy protection is not selected) may be directly collected (e.g., a list of known SSIDs (Wi-Fi networks), previously paired Bluetooth devices, device name, Installed browser plugins, etc.).

In some embodiments, this approach also provides the user the ability to decide which features require fuzzy hashing. This allows the user to control his/her privacy and anonymity. By default, a specific set of values (such as contacts) may be fuzzy hashed. It may be desirable to restrict the fuzzy hashing to fewer data points, e.g., just those for which heightened security is desired. This is because by obscuring more data with the fuzzy hashing, the amount of false positives may be increased (e.g., compared to a one-to-one comparison, which rarely leads to false positives). Accordingly, the system and/or user may wish to balance interests—the lesser the list of fuzzy hashed values, the lesser the false positives, but also the lesser the assumed privacy of the user. The higher the list of fuzzy hashed values, the higher the false positives during detection, but also the higher the assumed privacy of the user.

At step S210, the server computer 212 (e.g., using a backend application as shown in FIG. 2) retrieves data from the user device. The user device may send the data (in raw form and/or in the form of fuzzy hash(es)) to a backend application executing on a server computer 212.

At step S214, the server computer 212 may analyze and match the fuzzy hashes and/or unhashed data. As illustrated in FIG. 2, two fuzzy hashes are analyzed based on a similarity comparison of the hashes (e.g., a current fuzzy hash and a baseline fuzzy hash). The server computer 212 may compare the fuzzy hashes based on string similarity. The backend application may generate a similarity score based on the comparison.

Alternatively, or additionally, the server computer 212 may analyze and match data sets such as a set of Wi-Fi networks available to the user device, a set of Bluetooth networks available to the user device, plugins installed on the user device, a battery status of the user device, location information corresponding to the user device, or settings enabled on the user device. As an example, the server computer 212 compares a list of Bluetooth networks available to the user device, from a baseline data set, to another list of Bluetooth networks available to the user device, from a current data set. The current data set includes one additional Bluetooth network, but otherwise matches.

At steps S216-S218, the server computer 212 may authenticate the user based on the similarity comparison while preserving privacy via fuzzy hash(es). As described above, the server computer 212 may, for at least some of the data collected from the user device 204, have access to a fuzzy hash but not the underlying data. Accordingly, user privacy is preserved by not sharing the underlying data.

At S216, the server computer 212 may calculate a similarity score (e.g., a user score as shown in FIG. 2). The similarity score may be based on the comparisons performed at S214. For example, the similarity score may be a numerical value based on a weighted combination of similarity scores between two fuzzy hash pairs, Bluetooth data, and Wi-Fi data. As a specific example, the server computer 212 may use a function to generate a total similarity score such as 9×(hash match (image metadata))+2×(number of matching Bluetooth networks/1+number of non-matching Bluetooth networks).

At S216, the server computer 212 may compare the similarity score to a threshold value 222. The threshold value 222 may establish how strong of a match between the user data and stored baseline data is required to authenticate the user. As indicated in FIG. 2, the threshold value 222 may be received, at some initial time, via a user interface. For example, an administrator associated with the server computer and/or a resource the user of the user device 204 is attempting to access may establish the threshold value 222. Alternatively, or additionally, the user of the user device 204 may establish the threshold value 222.

The system may compare the calculated total similarity score to the threshold value 222. If the score exceeds the threshold value, the user may be authenticated. If the score does not exceed the threshold value, the user may be challenged. The user may be challenged, for example, using step-up authentication. Step-up authentication, may involve requesting additional information from the user. For example, the server computer may transmit a message to the user device causing the user device to present a modal to the user for entering a password. The server computer may then receive the password to use to authenticate the user. As another example, the server computer may send a validation code to a known phone number or email address of the user, which the user must provide back to the server computer in order to proceed.

FIG. 3 shows a simplified schematic diagram illustrating example operations performed by a user device, according to some embodiments. The operations 300 illustrated in FIG. 3 may be executed by a user device, which may be similar to the user device 800 illustrated in FIG. 8.

At step 302, the user device initiates an application. The user device may initiate an application responsive to received user input (e.g., the user clicks on the application via an interface). In some embodiments, opening the application may trigger the user device to initiate user authentication using a device fingerprint according to steps 304-306.

At step 304, the user device collects a data set from the user device. The data set may include data such as Bluetooth networks, applications installed on the device, the name of the device, etc., as described above with respect to FIGS. 1 and 2.

At step 306, the user device determines whether the user has provided permission for this application to permit data collection. For example, settings of the user device may require user permission for an application to access certain data such as available Wi-Fi networks, Bluetooth connections, or contacts. In some embodiments, along with data collection permission, user input is also received regarding permission to allow fuzzy hash collection. This mode allows data collection but the user's data anonymity and privacy is maintained.

At step 308, if permission is granted, the user device collects the data. Based on policy and/or user-configured rules, some of the data may be fuzzy hashed (e.g., applications and contacts), while other data may be retrieved in original form.

At step 310, if permission is not granted, the user device collects a subset of the data allowed by the user permissions. As an example, the user has refused access to the Wi-Fi, Bluetooth, and contacts, but permission is not required to access the installed applications. The user device may fuzzy hash the applications and omit the Wi-Fi, Bluetooth, and contacts from the collected data set.

At step 312, the user initiates an event in association with the user device. For example, the user may try to log in to a system using an email address or some other user identifier and/or password. The data may be collected asynchronously at steps 304-310 as the user logs in at 312. The user device may handle the event (e.g., by collecting login data and analyzing the login data and/or transmitting the login data to the server computer/backend).

At step 314, the user device transmits the collected information to a backend application executing on the server computer. The collected information may include a fuzzy hash of the applications and other data permitted such as Wi-Fi, Bluetooth, contacts, etc., as well as the login information provided by the user.

Advantageously, privacy is preserved because of fuzzy hashing on the client side. If permission is not received, the flow may continue. Information is collected on loading the application, leading to faster response time compared to if the information were collected after login.

FIG. 4 shows a simplified schematic diagram illustrating example operations performed by a server computer, according to some embodiments. FIG. 4 illustrates two possible paths—a success path 400 and a challenged path 450. The operations described with respect to FIG. 4 may be performed after the method 300 of FIG. 3, upon the server computer receiving a data set from the user device. The methods described FIG. 4 may be performed by a server computer similar to the server computer 900 described below with respect to FIG. 9.

Steps 402-408 illustrate a "success path" 400 wherein the user is authenticated without challenge. At step 402, the server computer executes backend fingerprint validation. The server computer may execute backend fingerprint validation by comparing one or more pieces of data obtained from the user device with corresponding baseline data. The server computer may arrive at a similarity score indicating a level of similarity between the current data from the user device and the baseline data from the user device.

At step 404, the server computer determines that the similarity score (e.g., a fingerprint score, as illustrated in FIG. 4) exceeds a threshold value. Based on the similarity score exceeding the threshold value, the server computer allows user login at step 406.

At step 408, the server computer updates the fingerprint. The server computer may update the fingerprint if the similarity score exceeds the threshold value. This may occur even if the similarity score does not represent an exact match. For example, most of the data is the same, but two new applications have been installed. The server computer may replace the baseline fingerprint with the current fingerprint. Alternatively, or additionally, the server computer may modify a portion of the fingerprint (e.g., add the two applications).

Steps 410-420 illustrate a "challenge path" 450 wherein the user login is challenged. At step 410, the server computer executes backend fingerprint validation. The server computer may collect user data, generate a fingerprint value, and compare the generated fingerprint value to a stored baseline fingerprint value to arrive at a similarity score.

At step 412, the server computer determines that the similarity score does not exceed a threshold value. Based on the similarity score not exceeding the threshold value, the server computer challenges user login at step 414. The server computer may challenge the user login by requiring additional validation steps, such as one-time password (OTP) authentication.

At step 416, the server computer determines whether authentication is approved or rejected, based on the challenge. For example, if the user does not pass OTP authentication, authentication is rejected. If the user passes OTP authentication, then authentication is approved.

At step 418, the server computer updates the baseline fingerprint, based on determining that authentication is approved. The server computer may add any new data collected about the user device to the fingerprint database entry associated with the user/user device.

At step 420, the server computer refrains from updating the baseline fingerprint, based on determining that authentication is rejected. If the new fingerprint is not likely to originate from an authentic user/user device, the server computer may determine not to update the baseline fingerprint value.

Figure 5A:
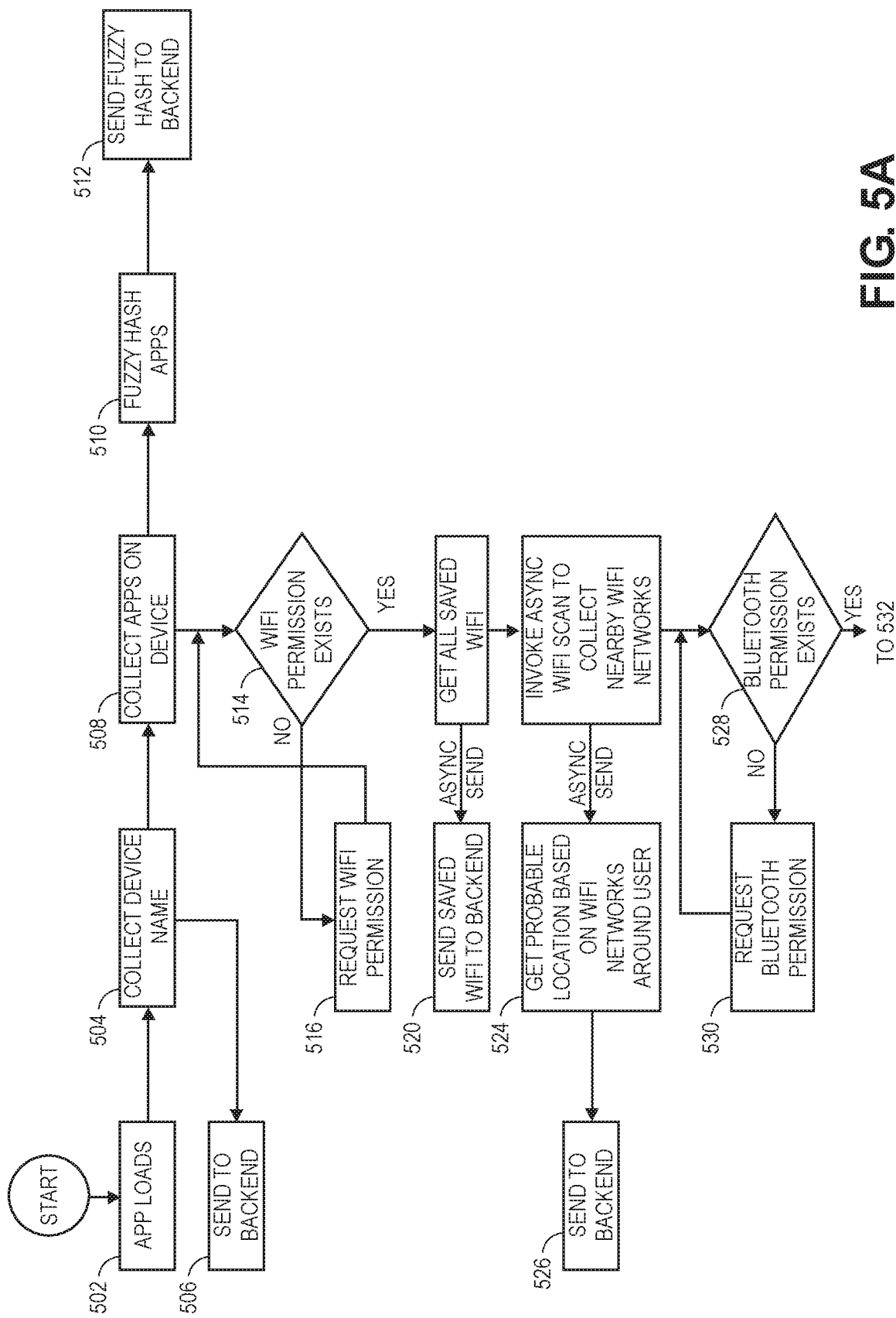
FIGS. 5A-5B show a flow chart illustrating user device operations for fingerprint validation in accordance with some embodiments.
Figure 5B:
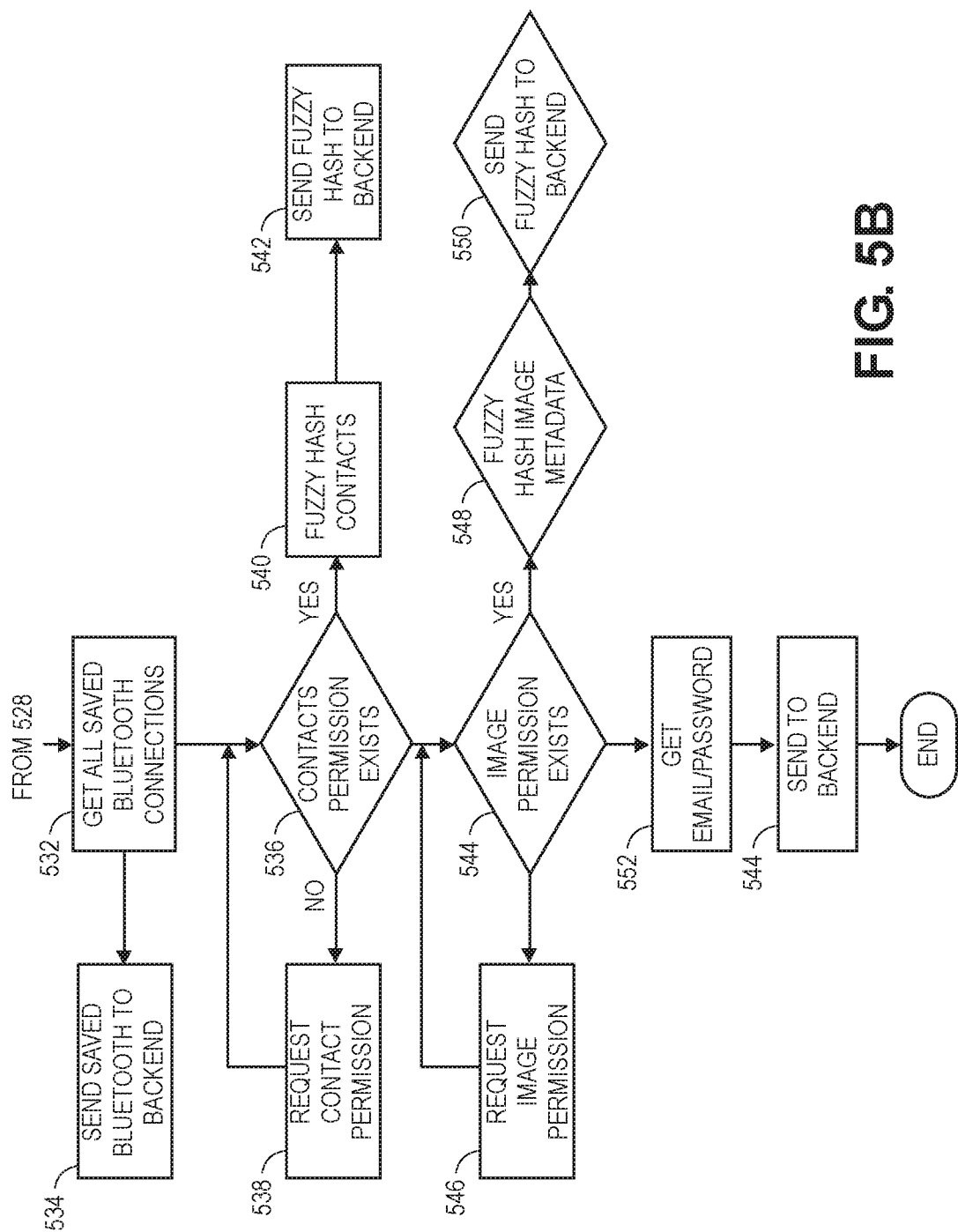

FIGS. 5A-5B shows a flow chart 500 illustrating user device operations for fingerprint validation in accordance with some embodiments. The operations in flow chart 500 may be performed by an application executing on the user device 800 described below with respect to FIG. 8.

At 502, an application loads. The application may initiate responsive to user input. For example, a user may tap on one of several applications displayed via a user device to initiate loading the selected application.

At 504, the application collects a device name. The device name may, for example, be a unique identifier of the user device, an IP address of the user device, or a text string associated with the user device (e.g., Joe's Phone). The user device may identify and retrieve the device name from device storage.

Figure 9:
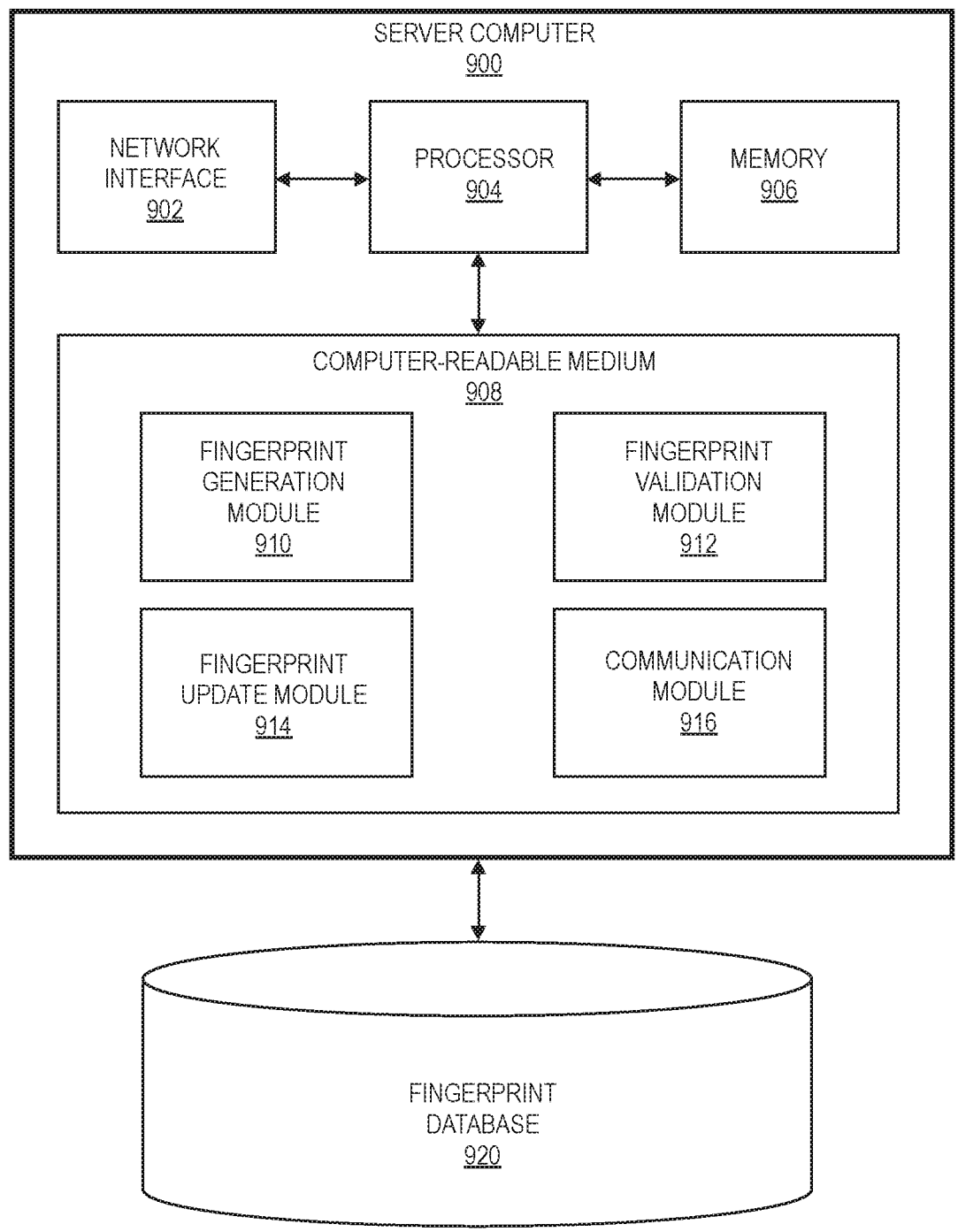
FIG. 9 is a block diagram of a server computer, in accordance with some embodiments.

At 506, the user device sends the device name to the backend (i.e., the server computer 900 depicted in FIG. 9). The user device may send the device name to the backend over a network via wired, wireless, or other suitable means of communication.

At 508, the user device collects applications on the user device. The user device may retrieve a list of applications which includes identifying information for a set of applications stored to the user device. At 510, the user device fuzzy hashes the applications. The user device may apply a fuzzy hashing algorithm to the list of applications to generate a string value corresponding to the applications. At 512, the user device sends the fuzzy hash of applications to the backend (e.g., to server computer 900 of FIG. 9).

At 514, the user device determines whether Wi-Fi permission exists for the application. A user associated with the user device may have, at some initial time, granted the application permission to retrieve Wi-Fi networks stored and/or available to the user device. The user device may search device settings stored to device memory to determine whether such permission exists.

At 516, if Wi-Fi permission does not exist, the user device may request Wi-Fi permission from the user. For example, the loaded application executing on the user device may display a modal requesting permission to access Wi-Fi. If the permission is granted, then the flow proceeds to 514 where it is determined that Wi-Fi permission now exists. If the permission is denied, then the flow may proceed, gathering other user data but omitting the Wi-Fi data. If Wi-Fi access is not granted, then the user device may store an indication that no Wi-Fi access has been granted.

At 518, if Wi-Fi permission exists, the user device may retrieve saved Wi-Fi data. The user device may retrieve a list comprising a set of saved Wi-Fi networks. At 520, the user device may transmit the list of saved Wi-Fi networks to the server computer (backend). The user device may transmit the list of saved Wi-Fi networks to the server computer asynchronously.

At 522, the user device may invoke an asynchronous Wi-Fi scan to collect nearby Wi-Fi networks. The user device may asynchronously transmit the list(s) of saved and/or nearby Wi-Fi networks to the backend. At 524, the user device may further determine a probable location of the device based on Wi-Fi networks around the user device, and transmit this information to the backend at 526.

At 528, the user device may determine whether Bluetooth permission exists. Similarly to 514, the user device may search permissions data on the user device to identify whether the user has previously granted permission for the application to access saved and/or available Bluetooth networks.

At 530, if no Bluetooth permission exists, then the system may request Bluetooth permission from the user. For example, the loaded application executing on the user device may display a modal requesting permission to access Bluetooth data. If the permission is granted, then the flow proceeds to 528 where it is determined that Wi-Fi permission now exists. If the permission is denied, then the flow may proceed, gathering other user data but omitting the Bluetooth data. If Bluetooth access is not granted, then the user device may store an indication that no Bluetooth access has been granted.

At 532, if Bluetooth permission exists, the user device may retrieve saved Bluetooth connections. At 534, the user device may send a list of saved Bluetooth connections to the server computer (backend).

At 536, the application executing on the user device may determine whether permission for the application to access stored contact data on the user device exists. The contact data may correspond to a list of names, phone numbers, email addresses, and the like.

At 538, no contact permission exists, then the application may request contact permission. If no contact access is granted, then the user device may store an indication that no image access has been granted. Based on such a stored indication, the application may refrain from requesting contact access in the future. If image access is granted, then the user device may return to 536 and determine that contact permission exists.

At 540, if contact access has been granted, then the user device may retrieve and fuzzy hash the contact data. At 542, the user device may send the fuzzy hash to the server computer (backend).

At 544, the application executing on the user device may determine whether permission for the application to access stored images and/or image metadata on the user device exists. If no image permission exists, then, at 546, the application may request image permission. If no image access is granted, then the user device may store an indication that no image access has been granted. If image access is granted, then the user device may return to 544 and determine that image permission exists.

At 548, if image access has been granted, then the user device may retrieve and fuzzy hash the image metadata. At 550, the user device may send the fuzzy hash to the server computer (backend).

In some embodiments, the user logs in to the application. The user login may correspond to a detected event. For example, the user device may receive, via user input, login credentials such as an email and password. At 552, the user device retrieves the email and password. At 544, the user device sends the email and password to the server computer (backend).

Figure 6:
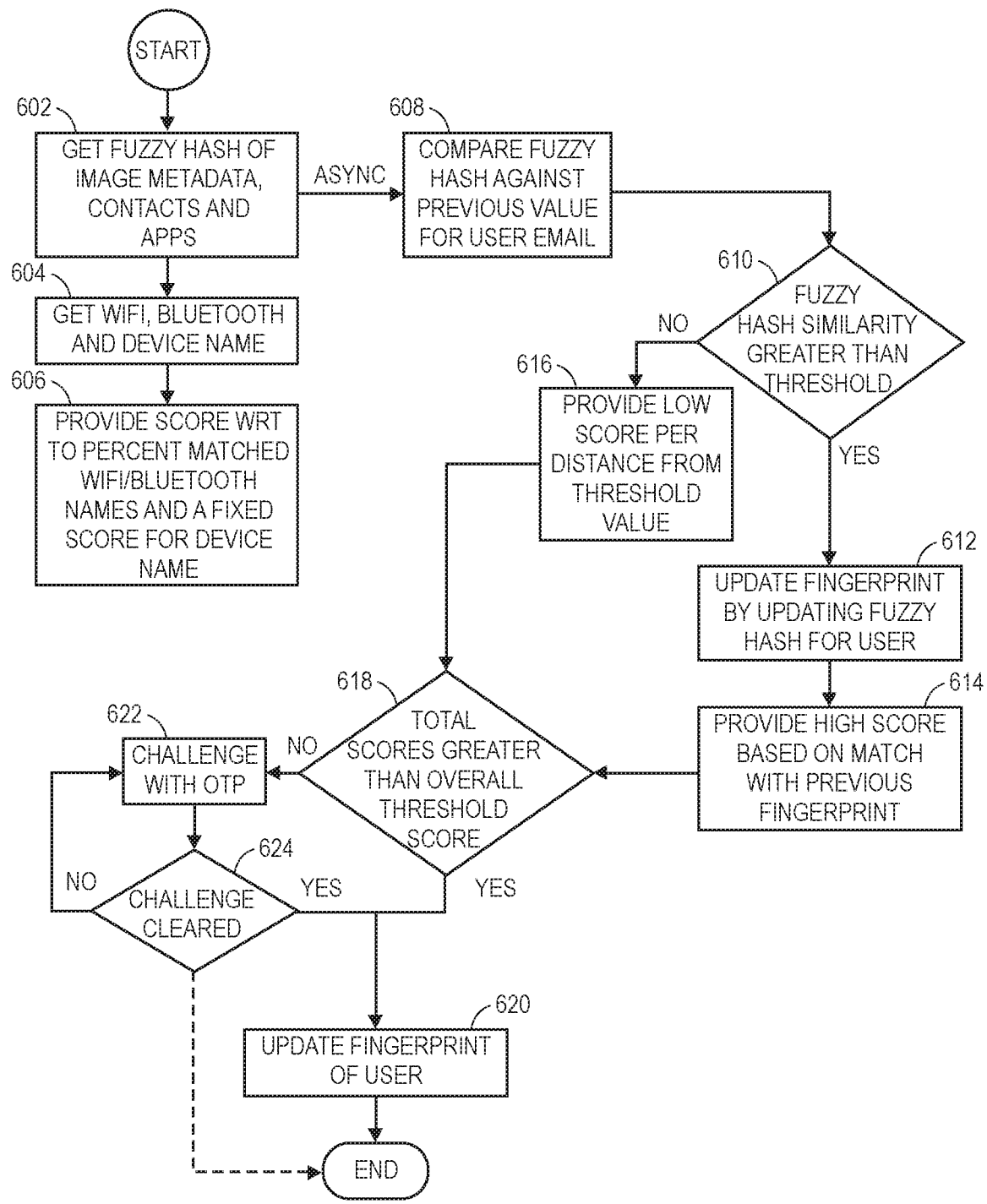
FIG. 6 shows a flow chart illustrating server computer operations for dynamic fingerprint validation in accordance with some embodiments.

FIG. 6 shows a flow chart 600 illustrating server computer operations for dynamic fingerprint validation in accordance with some embodiments. The operations shown in the flow chart 600 may be performed by the server computer 900 illustrated in FIG. 9.

At 602, the server computer retrieves, from the user device, one or more fuzzy hashes. The fuzzy hashes may correspond to user data such as image metadata, contacts, and applications. The server computer may receive the fuzzy hashes from the user device via a push or pull operation, e.g. via API.

At 608, The server computer may asynchronously compare a fuzzy hash against a previous value (e.g., a baseline fuzzy hash) that is associated with user information previously retrieved. For example, the system may store the baseline fuzzy hash in association with the user's email address or some other identifier of the user. Step 608 may be repeated for each fuzzy hash retrieved at 602. The server computer may determine a fuzzy hash similarity score based on the similarity between one or more fuzzy hashes.

At 610, the system compares the fuzzy hash similarity score to a threshold value. The system may identify a stored threshold value for the comparison. Based on the comparison, the server computer determines whether the fuzzy hash similarity score is greater than the threshold.

At 612, if the fuzzy hash similarity is greater than the threshold value, the server computer may update the fingerprint. The server computer may store the new fuzzy hash received at 602 to the fingerprint database in association with the user and/or user device. The server computer may update one or more fuzzy hashes for the user. For example, the server computer may determine that a stored baseline fuzzy hash corresponding to contacts is 95% similar to a received fuzzy hash value corresponding to contacts. This may indicate that the user has added or removed a contact, thus, the server computer updates the stored baseline fuzzy hash to reflect the updates to the user device.

At 614, if the comparison at 610 led to the determination that the fuzzy hash similarity is greater than the threshold, then the server computer may provide a relatively high similarity score based on the match with the previous fingerprint.

At 616, if the comparison at 610 led to the determination that the fuzzy hash similarity is less than the threshold, then the server computer may provide a low similarity score. The similarity score may correspond to the distance from the threshold value (e.g., a 30% match is assigned a 3/10 similarity score, while a 50% match is assigned a 5/10 similarity score).

At 604-606, the server computer may retrieve and analyze user data that has not been fuzzy hashed. The server computer may execute steps 604-606 asynchronously with retrieving and analyzing the fuzzy hash data at steps 602 and 608-616. At 604, the server computer may retrieve user data such as Wi-Fi networks, Bluetooth connections, device name, and the like.

At 606, the server computer may identify a similarity score based on comparison of the user data received at 604 to user data stored to the fingerprint database. The server computer may compute a similarity score, for example, with respect to the percent of matched Wi-Fi/Bluetooth names and a fixed score for the device name. As a specific example, the similarity score may be: 2(Wi-Fi Percent Match+3 (Bluetooth Match)+A, where A=1 if the device name received matches the device name stored, and A=0.2 if the device name received does not match the device name stored. Although the example flow describes certain user data parameters being compared, it should be understood that a variety of different user data parameters may be retrieved and compared. These parameters may or may not be hashed depending on the desired configuration and privacy level.

At 618, the score determined at 606 may be combined with the score determined at 610 to generate a total similarity score. For example, the total similarity score may be based on the similarity score of the fuzzy hash(es) and the similarity scores based on the Wi-Fi/Bluetooth/device name. The server computer compares the total similarity score to an overall threshold similarity score.

At 620, if the total similarity score is greater than the overall threshold similarity score, then the server computer updates the fingerprint of the user. The server computer may replace some or all of the user data stored to the fingerprint database with the updated data received at 602 and/or 604. Accordingly, the fingerprint stored to the fingerprint database is dynamic and reflects updates to the user device and its environment. Upon updating the fingerprint of the user, the server computer may end the authentication operations.

At 622, if the total similarity score is not greater than the overall threshold similarity score, then the server computer may challenge the user. For example, the server computer may request that the user provide an OTP or other form of step-up authentication.

At 624, the server computer determines whether the challenge is cleared. For example, the server computer may compare expected and received values, which may correspond to an OTP, biometric data, and/or the like. If the challenge at 622 is cleared (e.g., the user provides a correct OTP), then the system may proceed to 620 and update the fingerprint of the user as described above. If the challenge at 622 is not cleared (e.g., the user provides an incorrect OTP), then the server computer may return to 622 and challenge the user again. The server computer may challenge a second or third time based on some predetermined amount of tries allowed. If the user fails multiple challenges corresponding to such a threshold, then the server computer may end the operations and determine not to authenticate the user.

Based on the determined match level, the server computer may prepare an indication whether the user is authenticated. This may, for example, be a numerical score or a flag. The server computer may transmit such an indication to the application executing on the user device. The application may then determine whether or not to allow the user to proceed to access secure resources.

Figure 7:
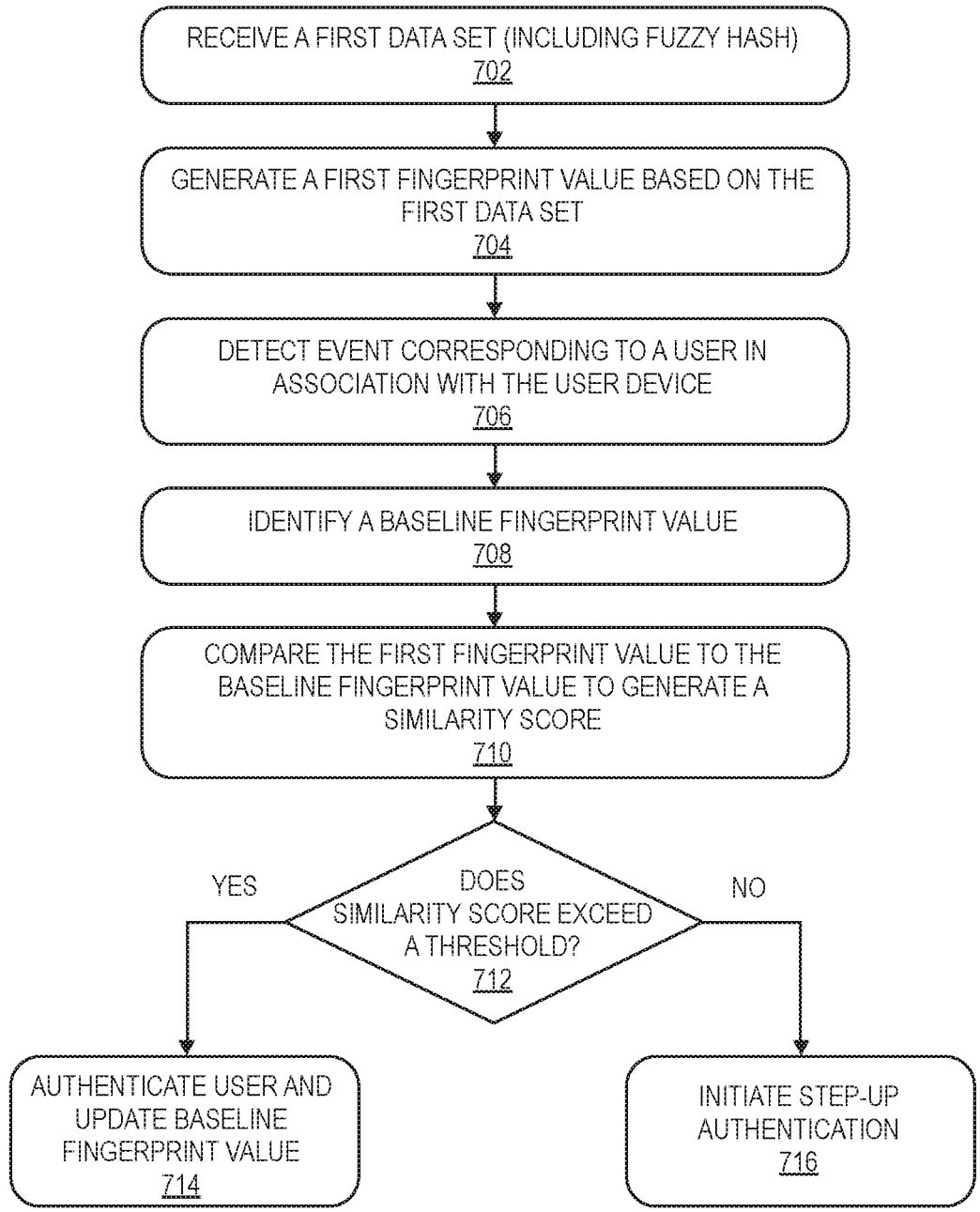
FIG. 7 is a flowchart illustrating operations for dynamic fingerprint validation in accordance with some embodiments.

FIG. 7 is a flowchart illustrating operations 700 for dynamic fingerprint validation in accordance with some embodiments. The operations 700 described with respect to FIG. 7 may be performed by a server computer (e.g. server computer 900 described below with respect to FIG. 9) in cooperation with a user device (e.g., user device 800 described below with respect to FIG. 8).

At 702, a first data set is retrieved. The server computer may retrieve the first data set from a user device. Retrieving the first data set from the user device may involve receiving the first data set from the user device (e.g., via API push or a message received over a wireless network). The first data set may include a first fuzzy hash of user data on the user device. As described above with respect to FIG. 2, the first data set may include a combination of data in original form and in fuzzy hashed form. The data may include information associated with the user device such as contacts, applications, and so forth.

A subset of the first data set may be fuzzy hashed, by an application executing on the user device, prior to transmitting the first data set to the server computer. As described above with respect to FIG. 2, data types for which heightened privacy is desired may be selected for fuzzy hashing. This may be preferable to fuzzy hashing everything in some cases, as direct comparison can have higher accuracy. A data type may, for example, be "applications," "contacts," "Bluetooth connections," and so forth. The data to be fuzzy hashed may be configured by the server computer or application. Alternatively, or additionally, the user may select data types to be fuzzy hashed. At some prior time, the application and/or server computer may receive user input specifying a set of data types to be fuzzy hashed. The application executing on the user device may select a subset of the first data set to fuzzy hash based on the user input. For example, a fuzzy hash of user data may be based on one or more of: applications installed on the user device, contacts stored in association with the user device, or image metadata stored in association with the user device. The application may generate one fuzzy hash for each data type (e.g., one for contacts, one for image metadata, and so forth), and/or a fuzzy hash based on two or more data types (e.g., a fuzzy hash of the contacts and the image metadata).

At 704, the server computer may generate a first fingerprint value based on the first data set. The first fingerprint value may directly correspond to the first data set. For example, the first fingerprint value may be a collection of user data including a fuzzy hash of contacts and a list of applications. In some cases, the server computer may generate the first fingerprint value based on additional information such as a timestamp or the like. In some embodiments, the collected data may be combined to generate another value, e.g., the first fingerprint value may be a fuzzy hash of the entire first data set. Alternatively, the data may be stored in its original form as the fingerprint value (e.g., one or more lists of raw data plus one or more fuzzy hashes may constitute the fingerprint value).

At 706, the server computer may detect an event corresponding to a user in association with the first user device. The user may, for example, log in to an application executing on the user device (e.g., with an email address, username, and/or password). The application may transmit the login information, and/or confirmation of successful login, to the server computer. In some embodiments, when a user opens the application on the user device, the user device begins gathering information to initiate steps 702-704. Steps 702-704 may execute asynchronously with the event at 706. Upon detecting the event, the server computer may proceed to 708.

At 708, the server computer may identify a baseline fingerprint value. The baseline fingerprint value may be stored to the fingerprint database 920 shown in FIG. 9 (e.g., in association with an identifier of the user and/or user device). The server computer may identify and retrieve the baseline fingerprint value from the fingerprint database 920 (e.g., by querying the fingerprint database 920 with the identifier of the user).

The baseline fingerprint value may have been previously generated by the server computer in a similar manner to generating the first fingerprint value, as described above at 704 (e.g., based on a baseline fuzzy hash of user data on the user device). In some embodiments, the baseline fingerprint value may have been generated based on user data retrieved from a different user device. For example, a user may have a phone and a tablet which both have a similar "ecosystem" of Bluetooth connections, Wi-Fi connections, applications, and the like.

At 710, the server computer may compare the first fingerprint value to the baseline fingerprint value to generate a similarity score. The server computer may compare discrete data elements (e.g., names in a list), and generate a similarity score based on a number of matches. The server computer may further compare a pair of fuzzy hashes using an algorithm. Such an algorithm may output a numerical representation of similarity. The server computer may compare both unhashed and hashed parts of the fingerprint. As an example, the first fingerprint value includes a first list of installed applications and a first fuzzy hash of contacts. The baseline fingerprint value includes a baseline list of installed applications and a baseline fuzzy hash of contacts. The server computer compares the first list of installed applications to the baseline list of applications, finding 90% similarity. The server computer compares the first fuzzy hash of contacts to the baseline fuzzy hash of contacts, and finds 80% similarity. The server computer averages the two to generate an 85% similarity score.

At 712, the server computer may determine whether the similarity score exceeds a threshold. The server computer may identify a stored threshold value. Such a value may correspond to a particular application, user, or type of user data. In some embodiments, different similarity scores may be established for different portions of the fingerprint (e.g., compare the fuzzy hash of contacts to a first threshold and compare list of applications to a second threshold). Alternatively, a single threshold value may be used at 712.

At 714, if the similarity score exceeds the threshold value, then the server computer may authenticate the user. In some embodiments, the similarity score may exceed the threshold value but not represent an exact match. By using fuzzy hashes, data can privately be verified without requiring an 100% match, unlike if traditional hashing methods were used. Based on the similarity score exceeding the identified threshold value, the server computer may determine that the user is likely authentic. The server computer may transmit instructions and/or unlock functionality of the application, so that the user may proceed to access resources in association with the application.

Further, the server computer may update the baseline fingerprint value based on the first fingerprint value. The server computer may modify the baseline fingerprint value in whole or in part (e.g., to add new contacts and Wi-Fi networks, remove image metadata that has been deleted, and so forth). Accordingly, the fingerprint is dynamic and may change with the user's environment.

At 714, if the similarity score does not exceeds the threshold, then the server computer may initiate step-up authentication. The server computer may, for example, transmit a validation code to the user using a known email address, as described above with respect to FIG. 2.

In some embodiments, multiple threshold values may be used. For example, based on the similarity score not meeting a first threshold, step-up may be initiated (e.g., for a moderate match level such as 60%). Based on the similarity score not meeting a second threshold different than the first threshold, the user may be immediately locked out of logging in or otherwise accessing a resource (e.g., based on a low match level such as 10%).

Figure 8:
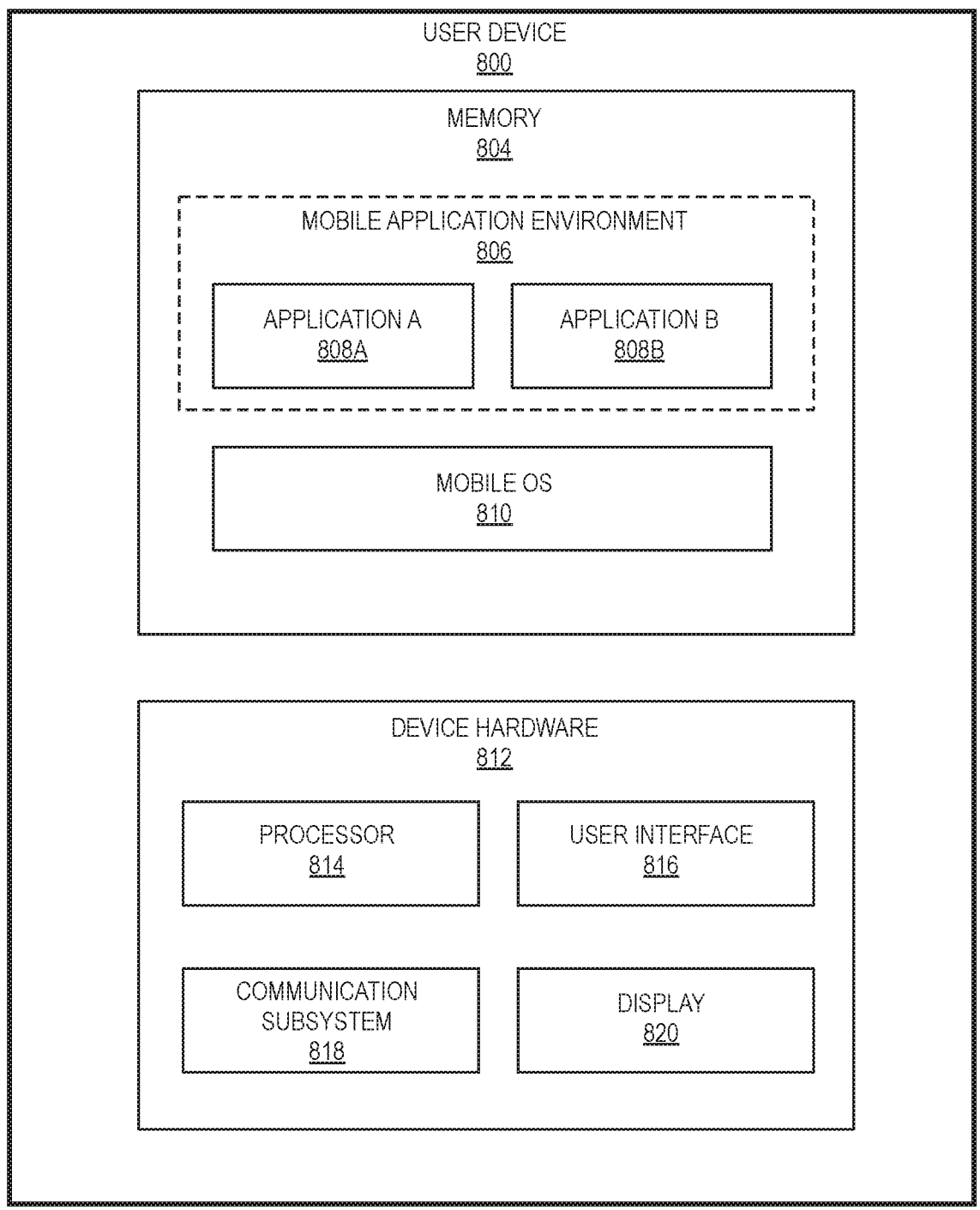
FIG. 8 is a block diagram of a user device, according to some embodiments.

FIG. 8 is a block diagram of a user device 800, according to some embodiments. The user device 800 may include hardware and/or software configured to collect and prepare user data for remote fingerprinting. The user device 802 may include a memory 804 coupled to device hardware 812.

For simplicity of illustration, a certain number of components are shown in FIG. 8. It is understood, however, that embodiments may include more than one of each component. In addition, some embodiments may include fewer than or greater than all of the components shown in FIG. 8.

The device hardware 812 may include a processor 814, a communication subsystem 818, user interface 816, and a display 820. Processor 814 can be implemented as one or more integrated circuits (e.g., one or more single core or multicore microprocessors and/or microcontrollers), and is used to control the operation of user device 800. Processor 814 can execute a variety of programs in response to program code or computer-readable code stored in memory 804, and can maintain multiple concurrently executing programs or processes. Communication subsystem 818 may include one or more Radio-Frequency (RF) transceivers and/or connectors that can be used by user device 800 to communicate with other devices and/or to connect with external networks. User interface 816 can include any combination of input and output elements to allow a user to interact with and invoke the functionalities of user device 802. In some embodiments, display 820 may be hardware and/or software configured to display information to the user (e.g., a screen).

The memory 804 can be implemented using any combination of any number of non-volatile memories (e.g., flash memory) and volatile memories (e.g., DRAM, SRAM), or any other non-transitory storage medium, or a combination thereof media. Memory 804 may store a mobile Operating System (OS) 810 (e.g., an operating system for the user device 800).

The memory 804 may further comprise a mobile application environment 806. Applications, such as application A 808A and application B 808B, may reside in the mobile application environment 806.

The applications 808A and 808B may include software for performing coordinated functions. Applications 808A and 808B may be mobile applications. Examples of applications include banking applications, shopping applications, photo sharing applications, social network applications, mobile games, and so forth. The applications 808A and/or 808B may include aspects that provide access to secure resources (e.g., banking information, allowing the user to purchase goods or services, allowing the user to access a secure employee database, and so forth). Applications 808A and 808B may include functionality for retrieving and transmitting user data. Applications 808A and 808B may include functionality for identifying user data for retrieving and/or fuzzy hashing. Applications 808A and 808B may include functionality for fuzzy hashing user data by applying a fuzzy hashing algorithm to the user data.

FIG. 9 is a block diagram of a server computer 900, in accordance with some embodiments. Server computer 900 may include a network interface 902, processor 904, memory 906, and computer-readable medium 908. The server computer 900 may further include, or be communicatively coupled to, a fingerprint database 920.

The processor 904 may be implemented as one or more integrated circuits (e.g., one or more single core or multicore microprocessors and/or microcontrollers). The processor 904 may be used to control the operation of the server computer 900. The processor 904 can execute a variety of programs in response to program code or computer-readable code stored in memory 906. The processor 904 may include functionality to maintain multiple concurrently executing programs or processes.

The network interface 902 may be configured to connect to one or more communication networks to allow the server computer 900 to communicate with other entities such as a user device. For example, communication with a user device may be direct, indirect, and/or via an API.

The memory 906 may be implemented using any combination of any number of non-volatile memories (e.g., flash memory) and volatile memories (e.g., DRAM, SRAM), or any other non-transitory storage medium, or a combination of media.

The computer-readable medium 908 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 908 may be any combination of such storage or transmission devices.

The computer-readable medium 908 may comprise software code stored as a series of instructions or commands. The computer-readable medium 908 comprises code, executable by the processor 904, to implement methods as described herein. The computer-readable medium 908 may comprise a fingerprint generation module 910, fingerprint validation module 912, a fingerprint update module 914, and a communication module 916. Each of these modules may include code configured to perform the functions described below in conjunction with the processor 904.

The fingerprint generation module 910 may comprise code that causes the processor 904 to generate a fingerprint. Fingerprint generation module 910 may include code for gathering, storing, and indexing user data. In some embodiments, fingerprint generation module 910 may include code for computing values based on user data.

The fingerprint validation module 912 may comprise code that causes the processor 904 to check a fingerprint value, e.g., by comparing the fingerprint value to stored values. Fingerprint validation module 912 may include code for identifying and comparing a baseline fingerprint value to a newly generated fingerprint value. Such a comparison may result in a similarity score. Fingerprint validation module 912 may include code for identifying a threshold score for validation, and comparing the similarity score to the threshold value.

The fingerprint update module 914 may comprise code that causes the processor 904 to update a fingerprint. Fingerprint update module 914 may include code for altering a stored fingerprint value based on updated information. For example, fingerprint update module 914 may comprise code that causes the processor 904 to add information to the fingerprint database 920 (e.g., new Bluetooth connections), alter information in the fingerprint database 920 (e.g., an updated contact name), and/or delete information in the fingerprint database 920 (e.g., remove contacts that have been deleted on a user device).

The communication module 916 may comprise code that causes the processor 904 to generate messages, forward messages, reformat messages, and/or otherwise communicate with other entities.

The server computer 900 may further include, or be communicatively coupled to, a fingerprint database 920. The fingerprint database 920 may be a storage unit and/or device (e.g., a file system, database, collection of tables, or other storage mechanism) for storing data. The fingerprint database 920 may include multiple different storage units and/or devices. The fingerprint database 920 may store fingerprints, e.g., collections of user data and/or derivations thereof. For example, the fingerprint database 920 may store tables, indexed by a user identifier, which store various data elements characterizing the user and one or more user devices associated with the user. As a specific example, for User 1, the fingerprint database 920 stores a list of Bluetooth networks, a list of applications and three fuzzy hashes, indexed by an identifier of User 1. For User 2, the fingerprint database 920 stores a different list of Bluetooth networks, a different list of applications, and three different fuzzy hashes, indexed by an identifier of User 2.

Embodiments of the invention may provide a number of advantages. For example, dynamic fingerprinting adds complexity to authentication without user friction. In some prior systems, fingerprints are device-specific, which does not permit tracking the user across multiple devices. Further, prior systems can fail when the same device is modified. The methods of the current disclosure fingerprint the user ecosystem, based on surroundings and preferences. Further, the fingerprint is dynamic and is updated as the user's ecosystem evolves.

Additional benefits include anonymizing psychopathic information about the user. Embodiments of the disclosure anonymize user data such as contacts and applications to preserve privacy while retaining uniqueness. Further, by anonymizing the data using fuzzy hashes, the fingerprint can be dynamically updated while preserving privacy because an exact match is not required to match the fuzzy hashes. In prior systems, a partial match cannot be discerned without analyzing all the non-anonymized data—thus, without the invention, privacy is violated for a better fingerprint (i.e., gathering more data points). Embodiments of the present disclosure provide a privatized, updateable fingerprint while enabling access to a larger set of data to provide a better, more accurate fingerprint for authentication.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   (i) retrieving, by a server computer, a first data set from a user device, wherein the first data set comprises (a) a first fuzzy hash of user data on the user device and (b) one or more wireless networks available to the user device, wherein the first fuzzy hash is generated by the user device and transmitted to the server computer;
   (ii) based on the first data set, generating, by the server computer, a first fingerprint value;
   (iii) detecting, by the server computer, an event corresponding to a user in association with the user device;
   (iv) identifying, by the server computer, a baseline fingerprint value, wherein the server computer generated the baseline fingerprint value based on a baseline fuzzy hash of user data on the user device;
   (v) comparing, by the server computer, the first fingerprint value to the baseline fingerprint value to generate a similarity score;
   (vi) determining, by the server computer, that the similarity score exceeds a threshold value but does not represent an exact match; and
   (vii) based on the similarity score, authenticating the user and updating the baseline fingerprint value based on the first fingerprint value.

2. The method of claim 1, wherein the first data set further comprises one or more of: a set of Bluetooth networks available to the user device, plugins installed on the user device, a battery status of the user device, location information corresponding to the user device, or settings enabled on the user device.

3. The method of claim 1, wherein the first fuzzy hash of user data is based on one or more of: applications installed on the user device, contacts stored in association with the user device, or image metadata stored in association with the user device.

4. The method of claim 1, wherein comparing the first fingerprint value to the baseline fingerprint value to generate the similarity score comprises:
   comparing the first fuzzy hash to the baseline fuzzy hash; and
   comparing the one or more wireless networks available to the user device to a baseline set of available wireless networks.

5. The method of claim 1, wherein the user device is a first user device and the similarity score is a first similarity score, the method further comprising:
   retrieving, by the server computer, a second data set from a second user device, wherein the second data set comprises a second fuzzy hash of second user data on the second user device;
   based on the second data set, generating, by the server computer, a second fingerprint value;
   comparing, by the server computer, the second fingerprint value to the baseline fingerprint value, to generate a second similarity score;
   determining, by the server computer, that the second similarity score is below the threshold value; and
   based on the second similarity score, performing step-up authentication.

6. The method of claim 1, wherein steps (i) and (ii) are executed asynchronously with step (iii).

7. The method of claim 1, further comprising receiving user input specifying a set of data types to be fuzzy hashed, and selecting a subset of the first data set to fuzzy hash based on the user input.

8. A server computer, comprising:
   a memory;
   a processor;
   a non-transitory computer-readable medium comprising instructions, which, when executed by the processor, perform the steps of:
   (i) retrieving a first data set from a user device, wherein the first data set comprises (a) a first fuzzy hash of user data on the user device and (b) one or more wireless networks available to the user device, wherein the first fuzzy hash is generated by the user device and transmitted to the server computer;
   (ii) based on the first data set, generating a first fingerprint value;
   (iii) detecting an event corresponding to a user in association with the user device;
   (iv) identifying a baseline fingerprint value, wherein the server computer generated the baseline fingerprint value based on a baseline fuzzy hash of user data on the user device;
   (v) comparing the first fingerprint value to the baseline fingerprint value to generate a similarity score;
   (vi) determining that the similarity score exceeds a threshold value but does not represent an exact match; and
   (vii) based on the similarity score, authenticating the user and updating the baseline fingerprint value based on the first fingerprint value.

9. The server computer of claim 8, wherein the first fuzzy hash of user data is based on one or more of: applications installed on the user device, contacts stored in association with the user device, or image metadata stored in association with the user device.

10. The server computer of claim 8, wherein comparing the first fingerprint value to the baseline fingerprint value to generate the similarity score comprises:
    comparing the first fuzzy hash to the baseline fuzzy hash; and
    comparing the one or more wireless networks available to the user device to a baseline set of available wireless networks.

11. The server computer of claim 8, wherein the user device is a first user device and the similarity score is a first similarity score, the steps further comprising:
    retrieving a second data set from a second user device, wherein the second data set comprises a second fuzzy hash of second user data on the second user device;
    based on the second data set, generating a second fingerprint value;
    comparing the second fingerprint value to the baseline fingerprint value, to generate a second similarity score;
    determining that the second similarity score is below the threshold value; and
    based on the second similarity score, performing step-up authentication.

12. The server computer of claim 8, wherein steps (i) and (ii) are executed asynchronously with step (iii).

13. The server computer of claim 8, further comprising receiving user input specifying a set of data types to be fuzzy hashed, and selecting a subset of the first data set to fuzzy hash based on the user input.

14. A method comprising:
  collecting, by a user device, a first data set, wherein collecting the first data set comprises generating, by the user device, a first fuzzy hash of user data on the user device, and collecting, by the user device, one or more wireless networks available to the user device;
  transmitting, by the user device to a server computer, the first data set including (a) the first fuzzy hash and (b) the one or more wireless networks, the server computer using the first data set to generate a first fingerprint value;
  handling, by the user device, an event corresponding to a user in association with the user device;
  transmitting, by the user device to the server computer, information characterizing the event; and
  receiving, by the user device from the server computer, an indication of whether the user is authenticated, the indication determined by the server computer by comparing the first fingerprint value to a stored baseline fingerprint value to generate a similarity score that exceeds a threshold value but does not represent an exact match.

15. The method of claim 14, wherein the first data set further comprises one or more of: a set of Bluetooth networks available to the user device, plugins installed on the user device, a battery status of the user device, location information corresponding to the user device, or settings enabled on the user device.

16. The method of claim 14, further comprising:
  requesting, by the user device, user permission to access a subset of the user data; and
  receiving, by the user device, a response refusing the permission,
  wherein the user device retrieves the first data set omitting the subset of the user data.

17. The method of claim 14, wherein the event is a first event and the similarity score is a first similarity score, the method further comprising:
  collecting, by the user device, a second data set, wherein the second data set comprises a second fuzzy hash of second user data on the user device;
  generating, by the user device, a second fingerprint value based on the second data set;
  transmitting, by the user device to the server computer, the second fingerprint value;
  handling, by the user device, a second event corresponding to the user in association with the user device;
  transmitting, by the user device, information characterizing the second event; and
  receiving, by the user device from the server computer, a request for step-up authentication, the request prepared by the server computer based on comparing the second fingerprint value to the stored baseline fingerprint value to generate a second similarity score that is less than the threshold value.

18. The method of claim 14, further comprising receiving user input specifying a set of data types to be fuzzy hashed, and selecting a subset of the first data set to fuzzy hash based on the user input.

19. The method of claim 14, wherein the server computer generated the baseline fingerprint value based on a baseline fuzzy hash of user data on the user device.

20. The method of claim 14, wherein the first fuzzy hash of user data is based on one or more of: applications installed on the user device, contacts stored in association with the user device, or image metadata stored in association with the user device.

* * * * *